(12) United States Patent
Li

(10) Patent No.: US 10,785,351 B2
(45) Date of Patent: Sep. 22, 2020

(54) DISPLAY SCREEN, MOBILE TERMINAL AND MODULAR TERMINAL DEVICE

(71) Applicants: Zhejiang Geely Holding Group Co., Ltd., Hangzhou, Zhejiang Province (CN); Zhejiang Geely Automobile Research Institute Co., Ltd., Taizhou, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Taizhou, Zhejiang Province (CN)

( * ) Notice: Subject to any disclaimer, the term of this patent is extended or adjusted under 35 U.S.C. 154(b) by 0 days.

(21) Appl. No.: 16/348,496

(22) PCT Filed: Nov. 6, 2017

(86) PCT No.: PCT/CN2017/109527
§ 371 (c)(1),
(2) Date: May 8, 2019

(87) PCT Pub. No.: WO2018/086493
PCT Pub. Date: May 17, 2018

(65) Prior Publication Data
US 2019/0364140 A1    Nov. 28, 2019

(30) Foreign Application Priority Data
Nov. 9, 2016  (CN) .......................... 2016 1 0986466

(51) Int. Cl.
*G02F 1/1345* (2006.01)
*H04M 1/02* (2006.01)
(Continued)

(52) U.S. Cl.
CPC .... *H04M 1/0214* (2013.01); *G02F 1/133305* (2013.01); *G09F 9/302* (2013.01); *H04M 1/0268* (2013.01); *H04M 2250/16* (2013.01)

(58) Field of Classification Search
None
See application file for complete search history.

(56) References Cited

U.S. PATENT DOCUMENTS

2011/0210937 A1   9/2011   Kee et al.
2012/0062475 A1   3/2012   Locker et al.
(Continued)

FOREIGN PATENT DOCUMENTS

CN   102238257 A   11/2011
CN   104332487 A   2/2015
(Continued)

*Primary Examiner* — Richard H Kim
(74) *Attorney, Agent, or Firm* — Cheng-Ju Chiang

(57) ABSTRACT

The present invention provides a display screen, a mobile terminal having the display screen, and a modular terminal device composed of a plurality of the mobile terminals. The modular terminal device includes a plurality of the mobile terminals spliced together. The display screen includes a hard display screen connected to a main body and a flexible display screen connected to the hard display screen. The flexible display screen protrudes from the main body. The flexible display screen includes a first flexible display screen and a second flexible display screen. A first fold line is formed between the first flexible display screen and the second flexible display screen. The flexible display screen is foldable along the first fold line. The display screen of the present invention can be expanded according to the usage requirement when in use and can be folded up when not in use.

12 Claims, 11 Drawing Sheets

(51) Int. Cl.
*G02F 1/1333* (2006.01)
*G09F 9/302* (2006.01)

(56) References Cited

U.S. PATENT DOCUMENTS

| | | | |
|---|---|---|---|
| 2013/0010405 A1 | 1/2013 | Rothkopf et al. | |
| 2016/0026155 A1 | 1/2016 | Guo et al. | |
| 2016/0211450 A1* | 7/2016 | Song | H01L 27/3267 |

FOREIGN PATENT DOCUMENTS

| | | |
|---|---|---|
| CN | 204189088 U | 3/2015 |
| CN | 104679470 A | 6/2015 |
| CN | 104714613 A | 6/2015 |
| CN | 104717330 A | 6/2015 |
| CN | 106657459 A | 5/2017 |
| CN | 206212072 U | 5/2017 |
| EP | 2192750 A2 | 6/2010 |
| EP | 3035152 A1 | 6/2016 |
| JP | H9-311737 A | 12/1997 |
| JP | 2001-350428 A | 12/2001 |
| JP | 2004-205933 A | 7/2004 |
| JP | 2010-520511 A | 6/2010 |
| JP | 2015-201353 A | 11/2015 |
| JP | 2016-18198 A | 2/2016 |
| JP | 2016-178598 A | 10/2016 |
| WO | 2006-287982 A | 10/2006 |

\* cited by examiner

DISPLAY SCREEN, MOBILE TERMINAL AND MODULAR TERMINAL DEVICE

CROSS REFERENCE TO RELATED APPLICATION

The present application is a 35 U.S.C. § 371 National Phase conversion of International (PCT) Patent Application No. PCT/CN2017/109527, filed on Nov. 6, 2017, which is based on and claims priority of Chinese patent application No. 201610986466.2, filed on Nov. 9, 2016. The entire disclosure of the above-identified application is hereby incorporated by reference herein and made a part of this specification. The PCT International Patent Application was filed and published in English.

FIELD OF THE INVENTION

The present invention relates to the field of electronic device, and more particularly to a display screen, a mobile terminal having the display screen and a modular terminal device composed of a plurality of the mobile terminals.

BACKGROUND OF THE INVENTION

In view of carrying convenience considerations, a screen of a mobile terminal such as a mobile phone is generally not too big, and the size of most screens is 5-6 inches. When needing to browse the web, electronic documents, etc., the user may feel inconvenient in reading due to the font displayed on the mobile phone is too small, so the mobile phone is generally not as the first choice for office work, and the user generally needs to carry a large tablet computer or laptop for editing and browsing related electronic documents.

There is also a situation, when a few users need to be in a teleconference together, and a computer or television set is needed due to the screen of mobile phone is too small. And if there is no computer or television set in the car or in a specific location, it will be very inconvenient.

In addition, the old and waste phone may lead to a serious pollution problem in recent years. In generally, the old and waste mobile phone is abandoned only because of low battery capacity or configuration behind, but the screen is generally still good. Therefore, how to use the screen of old and waste mobile phones becomes a problem to be solved today.

Applicants have applied for a number of patents to solve some of the above problems, such as the China patent application Nos. CN201510036188.X, CN201510050123.0 and CN201510075047.9, etc. However, because the screen in this technology is narrow and not easy to carry and may result in some inconvenience in the actual use, it is necessary to provide a mobile device which is convenient to carry and easy to expand the size of the screen.

SUMMARY OF THE INVENTION

Technical Solution

Therefore, the present invention provides a display screen, a mobile terminal having the display screen, and a modular terminal device composed of a plurality of the mobile terminals. The display screen of the present invention can be expanded according to the usage requirement when in use and can be folded up when not in use. Further, a plurality of mobile terminals may be spliced together to form a modular terminal device when necessary. Thus, the needs of size of large-screen are satisfied and the mobile terminals are easy to carry also.

The display screen provided by the present invention includes a hard display screen and a flexible display screen connected to the hard display screen. The flexible display screen includes a first flexible display screen connected to the hard display screen and a second flexible display screen connected to the first flexible display screen. A first fold line is formed between the first flexible display screen and the second flexible display screen. The flexible display screen is foldable along the first fold line.

The mobile terminal provided by the present invention includes a main body. A front surface of the main body is provided with a display screen. The display screen includes a hard display screen connected to the main body and a flexible display screen connected to the hard display screen. The hard display screen is located directly above the main body. The flexible display screen protrudes from the main body. The flexible display screen includes a first flexible display screen connected to the hard display screen and a second flexible display screen connected to the first flexible display screen. A first fold line is formed between the first flexible display screen and the second flexible display screen. The flexible display screen is foldable along the first fold line.

The modular terminal device provided by the present invention includes a plurality of above-described mobile terminals spliced together.

Further, the mobile terminal further includes a control unit and a sensing unit. The sensing unit is configured to sense an angle between the first flexible display screen and the second flexible display screen. The control unit is configured to change a transparency of the second flexible display screen in response to an angular change between the first flexible display screen and the second flexible display screen sensed by the sensing unit.

Further, the flexible display screen includes a polymer dispersed liquid crystal layer. The control unit changes a transparency of the flexible display screen by controlling an electrical signal applied to the polymer dispersed liquid crystal layer.

Further, the control unit is configured to control the second flexible display screen to display an inverted image when the angle between the first flexible display screen and the second flexible display screen is less than an angular preset value.

Further, a front surface and a back surface of the flexible display screen are provided with a touch sensing layer. The control unit is configured to activate the touch sensing layer on the back surface of the flexible display screen based on a transparency of the flexible display screen and activate the flexible display screen based on a gesture input applied to the touch sensing layer.

Further, the control unit is configured to control the hard display screen to display a frequently used operation key and a page of functions that do not require a large screen display and control the flexible display screen to display a page of functions that require a large screen display.

Further, a length of the first flexible display screen is equal to a length of the second flexible display screen.

Further, the display screen has a width of 74 mm and a length of 210 mm. A total length of the flexible display screen is 160 mm. A distance between the first fold line and a free end of the second flexible display screen is 80 mm.

Further, a length of the second flexible display screen is equal to a sum of a lengths of the first flexible display screen and a length of the hard display screen.

Further, the display screen has a width of 74 mm and a length of 210 mm. A total length of the flexible display screen is 130 mm. A distance between the first fold line and a free end of the second flexible display screen is 105 mm.

Further, the first flexible display screen includes a first sub screen connected to the hard display screen and a second sub screen connected to the first sub screen and the second flexible display screen. A second fold line is formed between the first sub screen and the second sub screen. The first flexible display screen is foldable along the second fold line.

Further, a length of the first flexible display screen is equal to a length of the second flexible display screen. A sum of a length of the second flexible display screen and a length of the second sub screen is equal to a sum of a length of the first sub screen and a length of the hard display screen.

Further, the control unit is further configured to control a transparency of the second sub screen and the second flexible display screen based on an angular change between the first sub screen and the second sub screen.

Further, two opposite sides of the mobile terminal are provided with a first splicing power supply and data interface and a second splicing power supply and data interface that can corporate with each other.

In the mobile terminal and the modular terminal device of the present invention, the display screen can be expanded according to the usage requirement when in use and can be folded up when not in use. Further, a plurality of mobile terminals may be spliced together to form a modular terminal device when necessary. Thus, the needs of size of large-screen are satisfied and the mobile terminals are easy to carry also.

The foregoing description is merely an overview of the technical solution of the present invention. In order to having a clearer understanding of the technical means of the present invention can be implemented in accordance with the contents of the present invention and to make the above and other objects, features and advantages of the present invention more obvious, the following detailed description will be made with reference to the accompanying drawings, which are described in detail below.

DETAILED DESCRIPTION OF PREFERRED EMBODIMENTS

Best Mode

In order to further elucidate the technical means and efficacy of the present invention for achieving the intended purpose of the invention, the present invention will be described in more detail with reference to the accompanying drawings and preferred embodiments as follow.

First Embodiment

Figure 1:
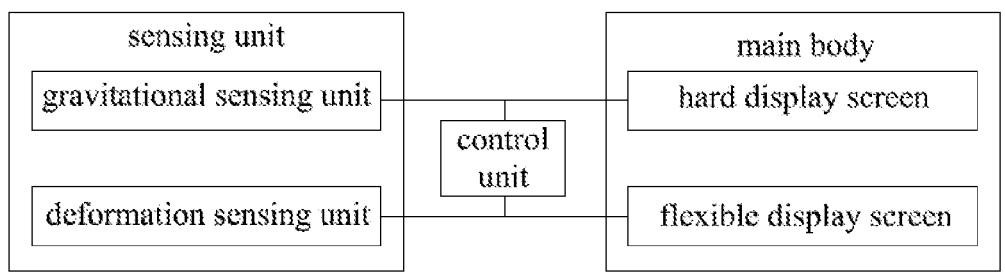
FIG. 1 is a system block diagram of a mobile terminal according to a first embodiment of the present invention.

FIG. 1 is a system block diagram of a mobile terminal according to a first embodiment of the present invention. The mobile terminal of the present invention may be a mobile phone, a tablet computer, or the like, and the present invention will be described below with a mobile terminal as a mobile phone. As shown in FIG. 1, the mobile terminal of the present invention includes a main body, a control unit and a sensing unit.

Figure 2:
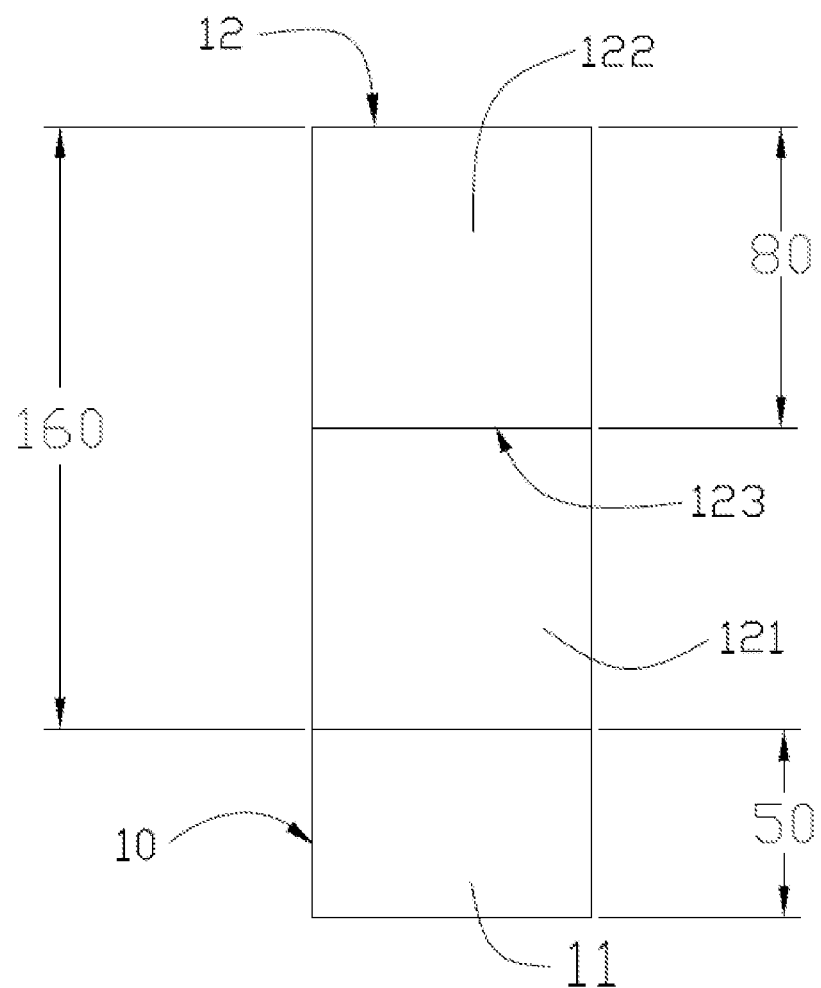
FIG. 2 is a schematic structural view of a mobile terminal according to a first embodiment of the present invention.

FIG. 2 is a schematic structural view of the mobile terminal shown in FIG. 1. As shown in FIG. 2, the main body is usually a rectangular housing formed of a material such as plastic or metal, and the main body constitutes a basic case of the mobile terminal. A display screen 10 is provided on the front side of the main body. The display screen 10 includes a hard display screen 11 connected to the main body and a flexible display screen 12 connected to the hard display screen 11. In the present invention, the hard display screen 11 refers to a so-called hard screen. The hard display screen 11 and the flexible display screen 12 are seamlessly connected, that is, the hard display screen 11 and the flexible display screen 12 do not have a clear dividing line in appearance when the mobile terminal is in a black screen state. The hard display screen 11 is located directly above the main body and its projection in the thickness direction of the mobile terminal completely coincides with the main body. The flexible display screen 12 protrudes from the main body in the width or length direction of the mobile terminal. FIG. 1 shows a main body in which the flexible display screen 12 protrudes from the mobile terminal in the width direction of the mobile terminal.

The flexible display screen 12 includes a first flexible display screen 121 connected to the hard display screen 11 and a second flexible display screen 122 connected to the first flexible display screen 121. A first fold line 123 is formed between the first flexible display screen 121 and the second flexible display screen 122. The first fold line 123 divides the flexible display screen 12 into the first flexible display screen 121 and the second flexible display screen 122. The first flexible display screen 121 and the second flexible display screen 122 are equal in length. Since the display screen 10 is placed in the width direction of the mobile terminal, the length of the display screen 10 is the length of the display screen 10 in the width direction of the mobile terminal. The first fold line 123 is located at a position from the free end of the second flexible display screen 122 at a fixed distance. In the present embodiment, the width of the display screen 10 is preferably 74 mm, the length is preferably 210 mm, the total length of the flexible display screen 12 is preferably 160 mm, and the distance between the first fold line 123 and the free end of the second flexible display screen 122 is preferably 80 mm. That is, the lengths of the first flexible display screen 121 and the second flexible display screen 122 are both 80 mm. The flexible display screen 12 may be folded along the first fold line 123 to change the angle between the first flexible display screen 121 and the second flexible display screen 122. In the present embodiment, the flexible display screen 12 does not cover the hard display screen 11 when the flexible display screen 12 is folded along the first fold line 123.

The flexible display screen 12 may be configured to have a housing and the flexible display screen 12 is disposed on the front surface of the housing. Considering the characteristics of the flexible display screen 12, the housing of the flexible display screen 12 may be configured to be deformable together with the flexible display screen 12 under the external forces. In the present invention, the housing of the flexible display screen 12 may be made of a material such as plastic, thin glass, fiber, thin metal (e.g., aluminum, etc.), textiles and silicon, or a combination thereof.

The flexible display screen 12 typically has two extreme position states: a fully expanded state and a fully folded state. When the flexible display screen 12 is in the fully expanded state, the entire image display surface of the flexible display screen 12 constitutes a substantially flat surface, and in this state it can be considered that the angle between the first flexible display screen 121 and the second flexible display screen 122 is 180°. When the flexible display screen 12 is in the fully folded state, the second flexible display screen 122 is positioned above the first flexible display screen 121 and the image display surface of the first flexible display screen 121 is substantially bonded to the image display surface of the second flexible display screen 122, and in this state it can be considered that the angle between the first flexible display screen 121 and the second flexible display screen 122 is 0°. The flexible display screen 12 is considered to be in an expanded state when the angle between the first flexible display screen 121 and the second flexible display screen 122 is greater than an angular preset value (e.g., 90°) and less than or equal to 180°. The flexible display screen 12 is considered to be in a folded state when the angle between the first flexible display screen 121 and the second flexible display screen 122 is less than the angular preset value and greater than or equal to 0°.

The sensing unit is configured to include a deformation sensing unit. The deformation sensing unit may include a deformation sensor for sensing the deformation information of the flexible display screen 12, but the present invention is not limited thereto. The deformation sensor may be provided in the flexible display screen 12. The deformation sensing unit is used for sensing the angle between the first flexible display screen 121 and the second flexible display screen 122 by sensing the deformation information around the flexible display screen 12, in particular the first fold line 123, so that the control unit controls the transparency of the second flexible display screen 122 and the display state of the displayed image thereof according to the angle between the first flexible display screen 121 and the second flexible display screen 122. Specifically, the control unit may compare the information sensed by the deformation sensing unit with the angular preset value between the first flexible display screen 121 and the second flexible display screen 122 built in the system and adjust the transparency of the second flexible display screen 122 and the display state of the displayed image thereof according to the comparing result.

For example, when the angle between the first flexible display screen 121 and the second flexible display screen 122 is gradually reduced and reduced to the angular preset value of 90°, the control unit starts to increase the transparency of the second flexible display screen 122 according to the comparing result. For example, when the angle between the first flexible display screen 121 and the second flexible display screen 122 is 90°, the control unit increases the transparency of the second flexible display screen 122 is to 10% and controls the image displayed by the second flexible display screen 122 to be an inverted image. When the angle between the first flexible display screen 121 and the second flexible display screen 122 is gradually increased and greater than the angular preset value of 90°, the control unit decreases the transparency of the second flexible display screen 122 according to the comparing result and controls the image displayed by the second flexible display screen 122 from an inverted image to a normal display image.

In the present invention, increasing the transparency indicates that the flexible display screen 12 is gradually changed from opaque to transparent. Decreasing the transparency indicates that the flexible display screen 12 is gradually changed from transparent to opaque.

In the present invention, the normal display image is an image displayed by the flexible display screen 12 in an expanded state, and the inverted image is an image obtained by inverting the normal display image.

The flexible display screen 12 may include a polymer dispersed liquid crystal (PDLC) layer, and the PDLC layer may change its transparency by a change of the electrical signal applied thereto. In the present embodiment, by controlling the transparency of the PDLC layer, the control unit can control the image output from the flexible display screen 12 to be not recognized through the other surface of the flexible display screen 12 or to be recognized through the other surface of the flexible display screen 12.

Specifically, when the angle between the first flexible display screen 121 and the second flexible display screen 122 of the flexible display screen 12 reaches an angular preset value, the flexible display screen 12 applies a specific voltage to the PDLC layer to control the transparency of the flexible display screen 12.

Based on the transparency, the control unit activates the touch sensing layer provided on the back surface of the second flexible display screen 122. For example, when the transparency of the second flexible display screen 122 is greater than 10%, the control unit may activate the touch sensing layer on the back surface of the second flexible display screen 122 so that the touch sensing layer receives the touch input from the user. That is, when the angle between the first flexible display screen 121 and the second flexible display screen 122 is gradually reduced and reduced to the angular preset value, the control unit activates the touch sensing layer on the back surface of the second flexible display screen 122. When the angle between the first flexible display screen 121 and the second flexible display screen 122 is gradually increased and greater than the angular preset value, the control unit keeps the touch sensing layer on the back surface of the second flexible display screen 122 in a deactivated state. Thus, the flexible display screen 12 is prevented from receiving the touch input of the user from the back surface thereof when the flexible display screen 12 is in the expanded state.

In the present embodiment, a touch sensing layer is also provided on the front surface of the flexible display screen 12. The touch sensing layer provided on the front surface of the flexible display screen 12 is used as a user input unit for the flexible display screen 12 in the expanded state, and the touch sensing layer provided on the back surface of the flexible display screen 12 is used as a user input unit for the flexible display screen 12 in the folded state.

The control unit is configured to activate the flexible display screen 12 according to specific gestures input on the touch sensing layer. The specific gestures may include short (or tap) touch, long touch, multi touch, drag touch, flick touch, pinch touch, pinch and release touch, brush touch, hover touch and so on.

The control unit is further configured to set a preset function for the hard display screen 11 and the flexible display screen 12. For example, the hard display screen 11 is set to display the commonly used operation keys (e.g., navigation keys, numeric keys, letter keys, etc.) and to display a page of a function not requiring a large-screen to display such as displaying music player, answer the phone, view time, text message, weather, and calendar. The function not requiring a large-screen to display in the present invention indicates the function does not require a large size screen, that is, the change in screen size does not affect the user experience much. The flexible display screen 12 is set to display a page of a function requiring a large-screen display such as displaying picture, video, reader and the like, that is, the change in screen size may affect the user experience much, and the application that the user has later installed such as WeChat, various types of video players and so on. This setting allows the hard display screen 11 and the flexible display screen 12 to be divided into specific functions so that the user does not need to change the display contents of the hard display screen 11 when operating the mobile terminal, thereby improving the running speed of the mobile terminal and user experience.

In some embodiments of the present invention, the preset function of the hard display screen 11 and the flexible display screen 12 is not limited thereto. For example, the flexible display screen 12 and the hard display screen 11 may also be set to: when a specific application is operated on the hard display screen 11, the interface or image corresponding to the application is displayed on the flexible display screen 12; or, when a specific application is operated on the hard display screen 11, a desktop picture of the mobile terminal is displayed on the flexible display screen 12 (see FIG. 6).

The sensing unit is further configured to include a gravitational sensing unit. The gravity sensing unit may include a gyroscope, but the present invention is not limited thereto. The gravity sensing unit is used for sensing the direction of the display screen 10 so that the control unit can adjust the direction of the display image according to the direction of the display screen 10. For example, when the gravity sensing unit senses that the hard display screen 11 is placed laterally, the control unit adjusts the display image of the hard display screen 11 to be displayed in a lateral direction according to the signal of the gravity sensing unit. When the gravity sensing unit senses that the hard display screen 11 is placed longitudinally, the control unit adjusts the display image of the hard display screen 11 to be displayed in a longitudinal direction according to the signal of the gravity sensing unit. If the flexible display screen 12 also displays an image, the control unit also controls the flexible display screen 12 to display an image laterally or longitudinally while controlling the hard display screen 11 to display an image laterally or longitudinally.

Figure 3:
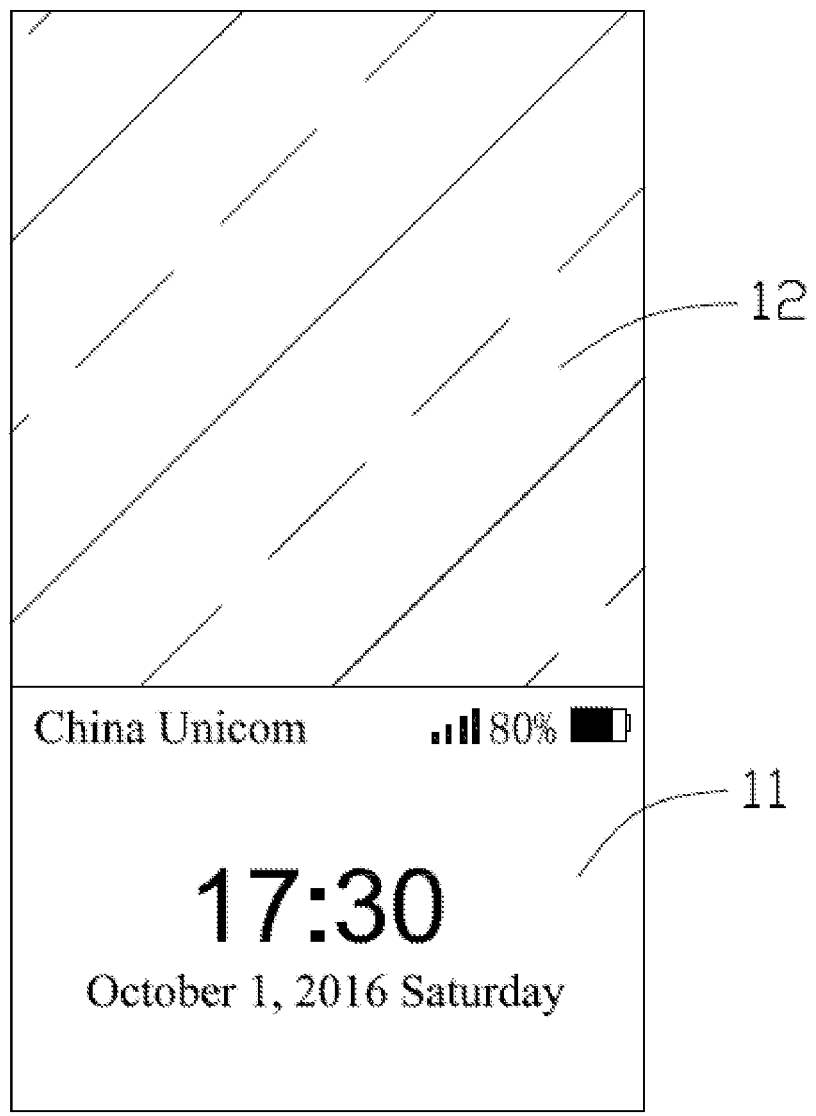
FIG. 3 is a schematic diagram of a first embodiment of the mobile terminal of FIG. 1 displaying an image.

FIG. 3 shows a schematic view of a first embodiment of the mobile terminal of FIG. 1 displaying an image. FIG. 3 shows that the user activates the hard display screen 11 when the mobile phone is in standby mode. At this time, the user input unit of the mobile terminal generates an activation signal of the hard display screen 11 due to the user's input and transmits the activation signal to the control unit. At the same time, the gravity sensing unit senses that the hard display screen 11 is placed laterally and transmits a corresponding signal to the control unit. The control unit controls the hard display screen 11 to display the preset information laterally according to the activation signal of the hard display screen 11 and the signal of the gravity sensing unit. In the present embodiment, the activation signal may be generated by pressing a physical key on the main body of the mobile terminal such as a power key, a navigation key, a call key, or the like. The preset information displayed on the hard display screen 11 is time information. It is understood that the preset information displayed on the hard display screen 11 may also be weather information, main screen information of the mobile terminal, and the like. In the present embodiment, since the control unit does not receive the activation information of the flexible display screen 12, the flexible display screen 12 is not activated.

Figure 4:
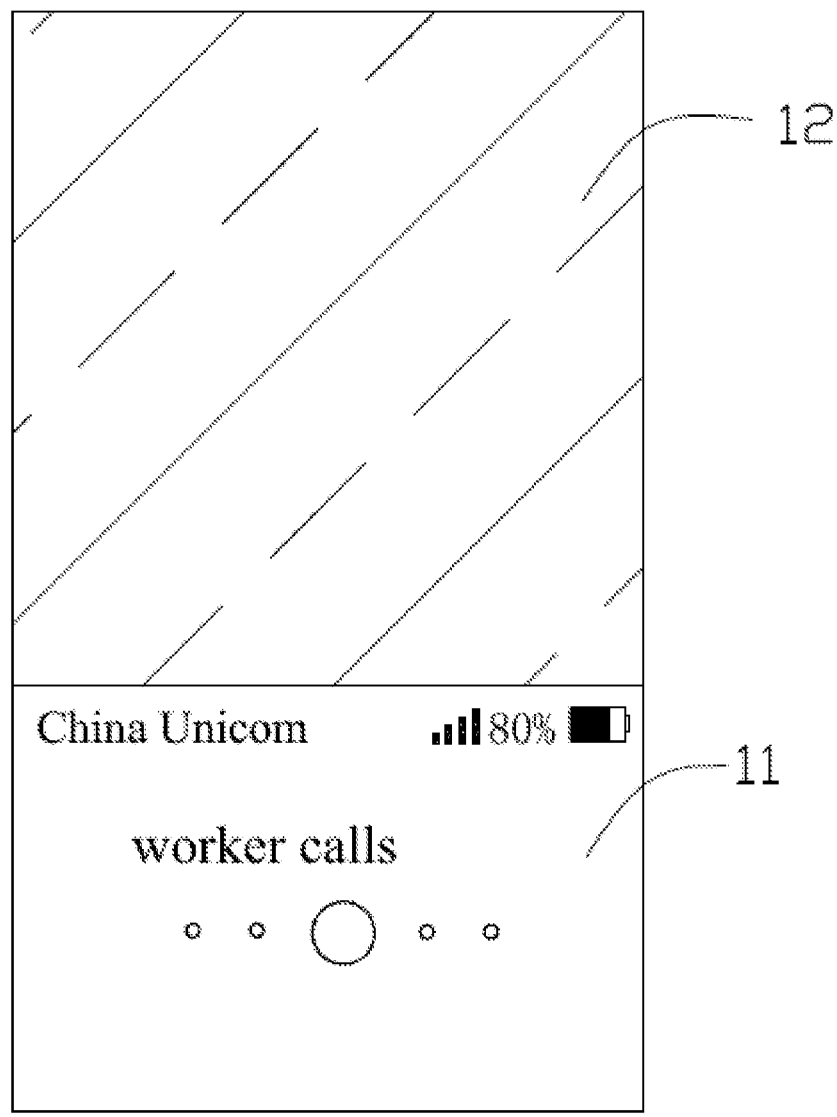
FIG. 4 is a schematic diagram of a second embodiment of the mobile terminal of FIG. 1 displaying an image.

FIG. 4 shows a schematic view of a second embodiment of the mobile terminal of FIG. 1 displaying an image. FIG. 4 shows that the hard display screen 11 is activated by an external call when the mobile phone is in a standby mode. At this time, the mobile communication unit of the mobile terminal generates an activation signal of the hard display screen 11 by receiving an external call and transmits the activation signal to the control unit. At the same time, the gravity sensing unit senses that the hard display screen 11 is placed laterally and transmits a corresponding signal to the control unit. The control unit controls the hard display screen 11 to display the incoming call information laterally according to the activation signal of the hard display screen 11 and the signal of the gravity sensing unit. In the present embodiment, since the control unit does not receive the activation information of the flexible display screen 12, the flexible display screen 12 is not activated.

Figure 5:
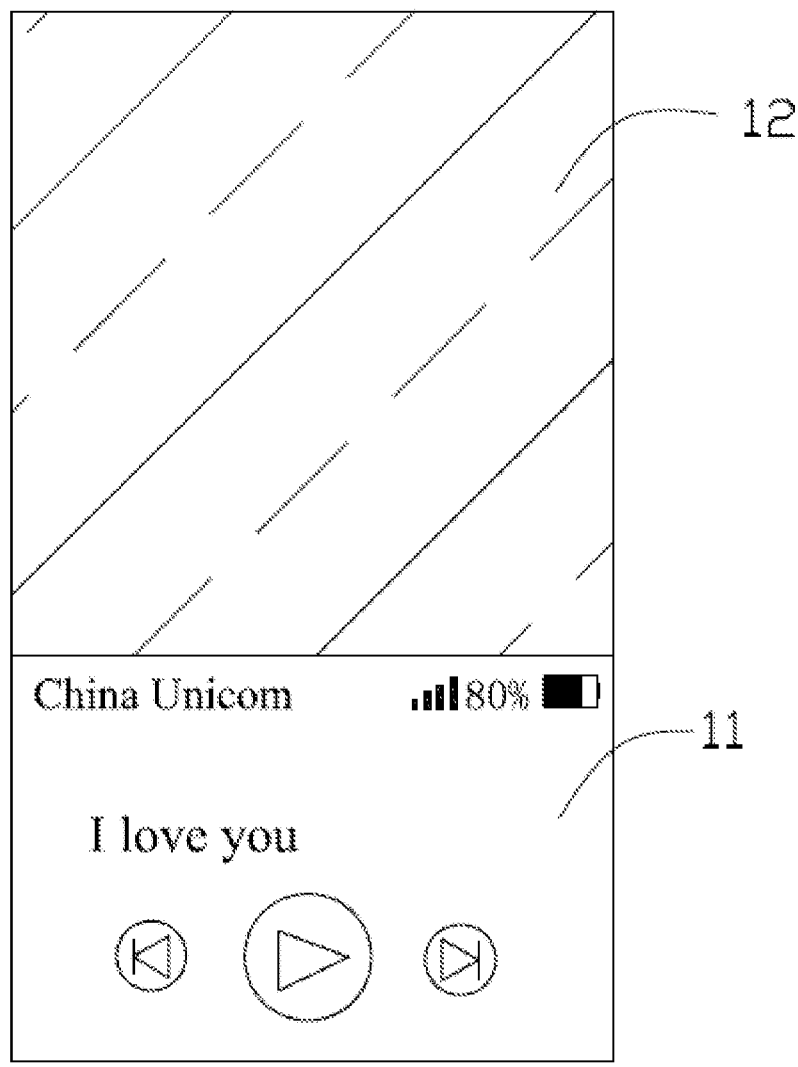
FIG. 5 is a schematic diagram of a third embodiment of the mobile terminal of FIG. 1 displaying an image.

FIG. 5 shows a schematic view of a third embodiment of the mobile terminal of FIG. 1 displaying an image. FIG. 5 shows a schematic view of operating a music player by using the hard display screen 11. When the control unit activates the hard display screen 11 according to the embodiment of FIG. 3 and controls the hard display screen 11 to display the preset information laterally, if the user also needs the hard display screen 11 to perform other operations such as operating a music player, the music player generates a corresponding operation signal according to the user input and transmits the operation signal to the control unit. The control unit controls the hard display screen 11 to display the corresponding picture according to the operation signal. In this process, since the control unit does not receive the activation information of the flexible display screen 12, the flexible display screen 12 is not activated.

Figure 6:
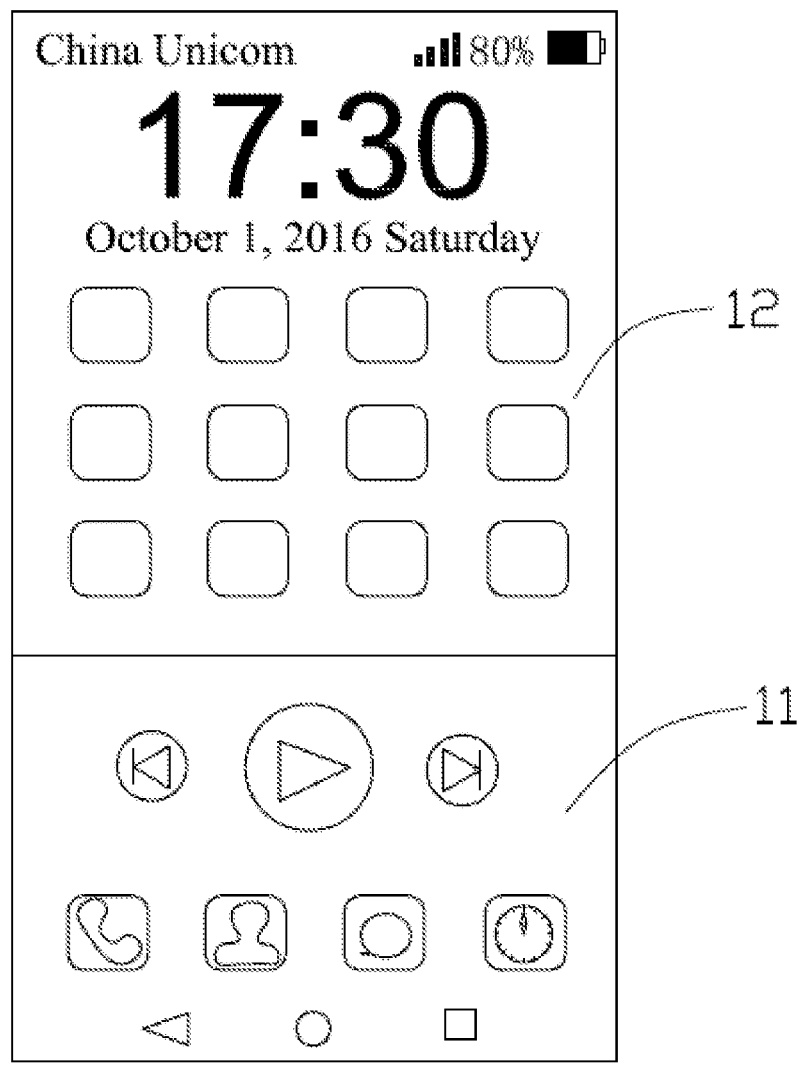
FIG. 6 is a schematic diagram of a fourth embodiment of the mobile terminal of FIG. 1 displaying an image.

FIG. 6 shows a schematic view of a fourth embodiment of the mobile terminal of FIG. 1 displaying an image. FIG. 6 shows a schematic view that the hard display screen 11 and the flexible display screen 12 both display images. When the control unit activates the hard display screen 11 according to the user's key input, the control unit controls the hard display screen 11 to display the preset information laterally according to the activation signal of the hard display screen 11 and the signal of the gravity sensing unit. In the present embodiment, the preset information displayed on the hard display screen 11 is the main screen information of the mobile terminal. And then, if the user also needs to use the hard display screen 11 to operate the music player, the control unit further displays the corresponding page of the music player on the main screen of the mobile terminal according to the signal issued from the music player. If the user further performs a corresponding activation operation on the flexible display screen 12 at this time, the flexible display screen 12 generates an activation signal according to the activation operation. The control unit further activates the flexible display screen 12 according to the activation signal of the flexible display screen 12 and determine the state of the flexible display screen 12 according to the signal transmitted from the deformation sensing unit, thereby controlling the flexible display screen 12 to display the preset picture according to the state of the flexible display screen 12. In the present embodiment, the flexible display screen 12 is in a fully folded state, and the control unit controls, after determining that the flexible display screen 12 is in the fully folded state based on the signal from the deformation sensing unit, the second flexible display screen 122 to be in a fully transparent state while controlling the second flexible display 122 to inversely display the preset picture of the flexible display screen 12. In the present embodiment, the preset picture of the flexible display screen 12 is the desktop picture of the mobile terminal, and the desktop information of the mobile terminal includes the current time in addition to the application icons. Of course, the preset picture of the flexible display screen 12 is not limited thereto. In other embodiments, it is not always necessary to display a preset picture on the flexible display screen 12, and a picture corresponding to the picture displayed on the hard display screen 11 such as the lyric and the artist of the song and other related information may be displayed on the flexible display screen 12.

In the present embodiment, the flexible display screen 12 is in a fully folded state, so that the entire display screen 10 of the mobile terminal as a whole appears to a display screen 10 of a large-sized mobile terminal after the hard display screen 11 is placed laterally, and thus enhancing the user's viewing experience.

Figure 7:
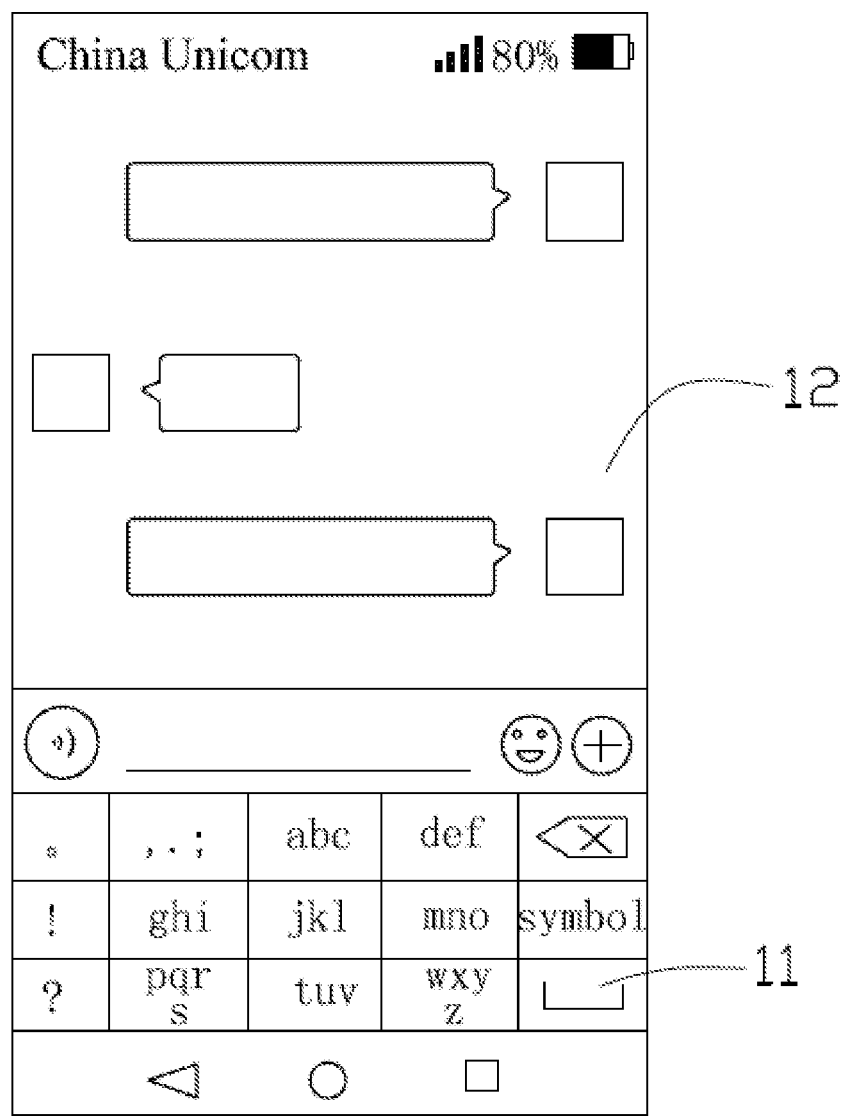
FIG. 7 is a schematic diagram of a fifth embodiment of the mobile terminal of FIG. 1 displaying an image.

FIG. 7 shows a schematic view of a fifth embodiment of the mobile terminal of FIG. 1 displaying an image. In the embodiment shown in FIG. 7, the placement state and the usage state of the mobile terminal are similar to those of the embodiment shown in FIG. 6. That is, the hard display screen 11 is placed laterally, the flexible display screen 12 is in a fully folded state, and both the hard display screen 11 and the flexible display screen 12 are in an activated state. When the hard display screen 11 and the flexible display screen 12 are activated, the user continues to operate the WeChat on the hard display screen 11. At this time, the control unit controls, based on the signal issued from the WeChat and the state of the hard display screen 11 and the flexible display screen 12, the hard display screen 11 and the second flexible display 122 of the flexible display screen 12 to display the corresponding image laterally, and the image displayed on the second flexible display screen 122 of the flexible display screen 12 is an inverted image. According to the pre-setting of the system, in this case, the hard display screen 11 is used for displaying the input interface of the WeChat which includes the information input window and the input keyboard, and the flexible display screen 12 is used for displaying the chat interface of the WeChat. Through this display way, the area of the input interface and the chat interface of the WeChat is increased, the user input is more convenient, and the user's viewing experience is enhanced.

Although several embodiments of the mobile terminal of the first embodiment of the present invention displaying an image are listed above, the display way of the mobile terminal is not limited thereto. For example, if it is desired to display more content or to further increase the display area, the flexible display screen 12 may be expanded and the entire flexible display screen 12 is as a whole, and images may be displayed on the front surface of the flexible display screen 12. For example, the picture, video play interface and reading interface of a reader may be displayed on the front surface of the entire flexible display screen 12, thus further enlarging the display screen so that the size of the flexible display screen 12 is enlarged to 6.9 inches, thereby further increasing the display effect and enhancing the user's viewing experience.

In other embodiments of the present invention, the display contents of the hard display screen 11 and the flexible display screen 12 may be set to be independent to each other. For example, the hard display screen 11 is used for displaying the weather, time, SMS, WeChat, news, etc., and the flexible display screen 12 is used for displaying the video play interface, music player interface, etc. Thus, the contents of the hard display screen 11 and the flexible display screen 12 can be displayed without affecting each other, and therefore, the user may use the flexible display screen 12 to watch movies or listen to music while using the hard display screen 11 to browse the news, reply to the message, view the weather, time, social information and so on.

Second Embodiment

Figure 8:
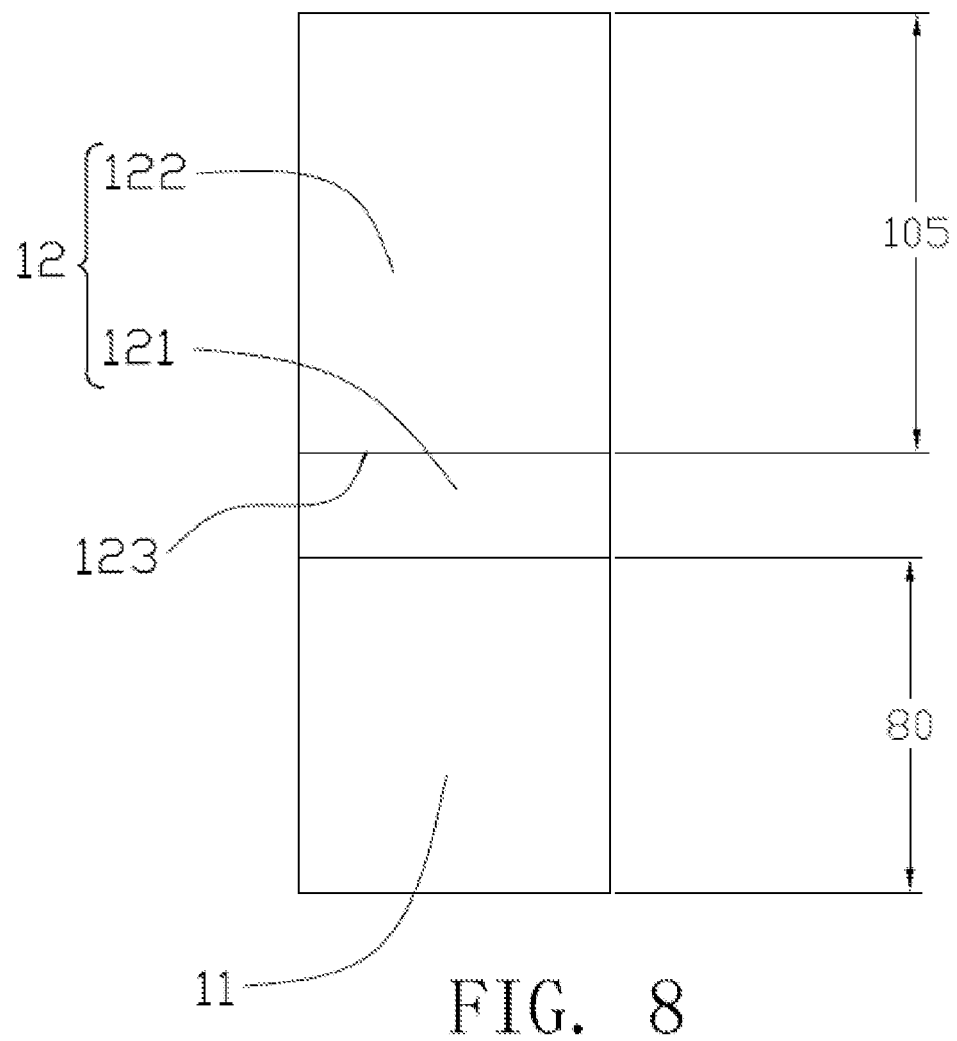
FIG. 8 is a schematic structural view of a mobile terminal according to a second embodiment of the present invention.

FIG. 8 is a schematic structural view of a mobile terminal in accordance with a second embodiment of the present invention. In the second embodiment, the mobile terminal also includes a main body, a control unit and a sensing unit. In the second embodiment, most of the control logic of the sensing unit and the control unit of the mobile terminal are basically the same as those in the first embodiment, and no redundant detail is to be given herein. The mobile terminal of the second embodiment is different from the mobile terminal of the first embodiment in that a part of the control logic of the control unit and the size of the main body, the hard display screen 11 and the flexible display screen 12.

As shown in FIG. 8, in the second embodiment, the lengths of the first flexible display screen 121 and the second flexible display screen 122 are not equal, and the length of the second flexible display screen 122 is equal to the sum of the length of the first flexible display screen 121 and the length of the hard display screen 11. In the present embodiment, the width of the display screen 10 is also preferably 74 mm, and the length is also preferably 210 mm. However, the total length of the flexible display screen 12 is preferably 130 mm, the distance between the first fold line 123 and the free end of the second flexible display screen 122 is preferably 105 mm, that is, the length of the first flexible display screen 121 is 25 mm and the length of the second flexible display screen 122 is 105 mm. The second flexible display screen 122 of the flexible display screen 12 covers the hard display screen 11 when the flexible display screen 12 is folded along the first fold line 123. Thus, once the flexible display screen 12 is fully folded, the outer shape of the mobile terminal of the present embodiment is no different with the ordinary mobile terminal and the size of the display screen 10 is about 5 inches.

In the second embodiment, the control unit may be configured to: control the second flexible display screen 122 of the flexible display screen 12 in an opaque state when the flexible display screen 12 is in the fully folded state and the mobile terminal is in a standby mode. Thus, the second flexible display screen 122 may act as a cover for the mobile terminal when the mobile terminal is in a standby mode. When the mobile terminal is activated by an external input, the hard display screen 11 is in an off-screen state, the control unit first controls the second flexible display screen 122 to be fully transparent based on the signal of the deformation sensing unit and controls the second flexible display screen 122 to inverted display the preset image of the second flexible display screen 122.

The control unit may also be configured to: control the second flexible display screen 122 of the flexible display screen 12 in a fully transparent state when the flexible display screen 12 is in a fully folded state and the mobile terminal is in a standby mode. When the mobile terminal is activated by an external input, the hard display screen 11 is in an off-screen state, the control unit first activates the second flexible display screen 122 and controls the second flexible display screen 122 to reversely display the preset image of the second flexible display screen 122 according to the signal of the deformation sensing unit.

If it is desired to display more content or to further increase the display area, the flexible display screen 12 may be expanded and the entire flexible display screen 12 is as a whole, and images may be displayed on the front surface of the flexible display screen 12. For example, the picture, video play interface and reading interface of a reader may be displayed on the front surface of the entire flexible display screen 12, thus further enlarging the display screen. The size of the flexible display screen 12 is about six inches, and the size of the hard display screen 11 is about four inches. The hard display screen 11 is configured to display some frequently used keys, such as a navigation key, a numeric key, a letter keypad, etc., and the flexible display screen 12 is configured to display the main content, that is, a display image from which the user most desires to view or obtain information. Thus, by dividing the hard display screen 11 and the flexible display screen 12 with specific functions, the user does not need to change the display contents of the hard display screen 11 at the time of operating the mobile terminal, thereby improving the running speed of the mobile terminal and the user experience.

In other embodiments of the present invention, the display contents of the hard display screen 11 and the flexible display screen 12 may have other functional divisions. Please refer to the first embodiment of the mobile terminal for the detail, and no redundant detail is to be given herein.

Third Embodiment

Figure 9:
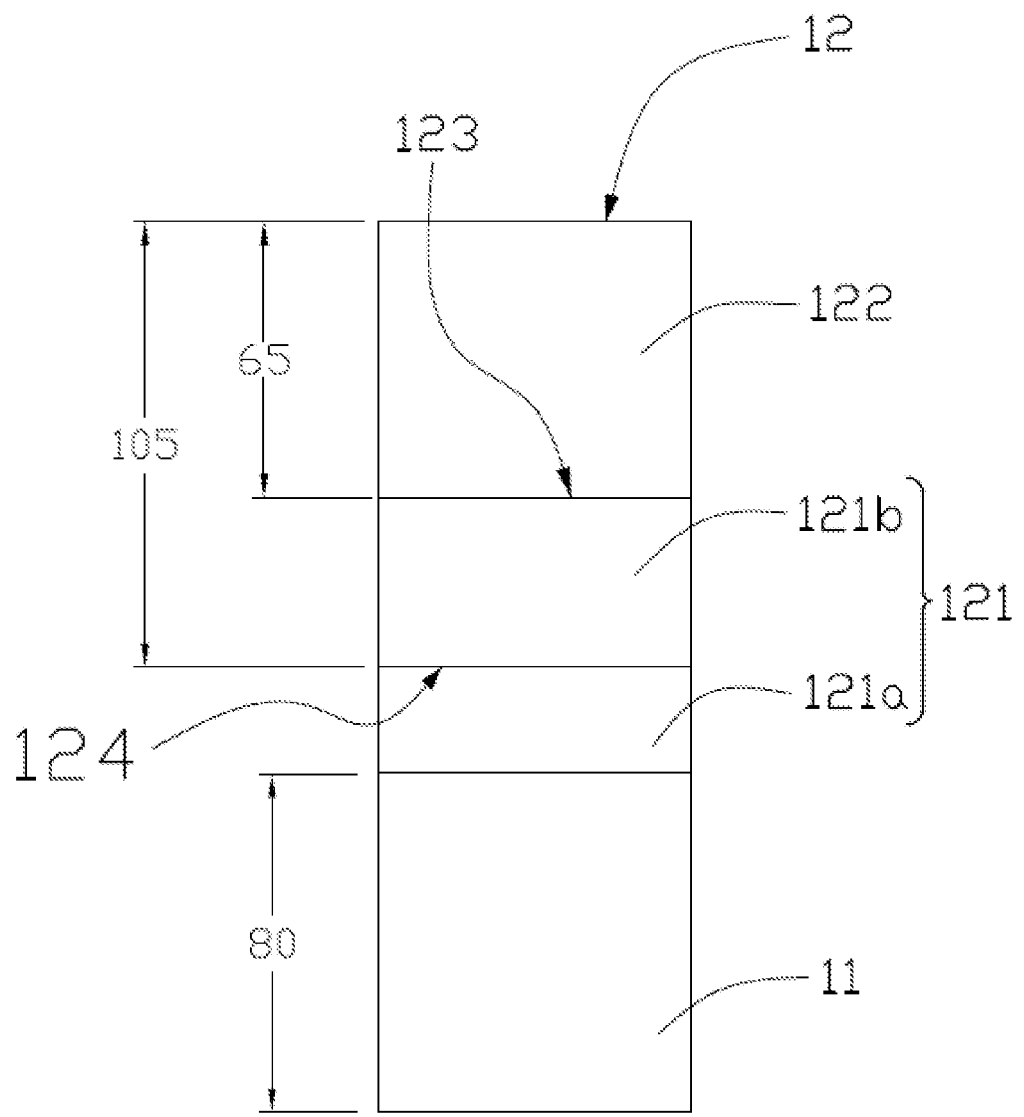
FIG. 9 is a schematic structural view of a mobile terminal according to a third embodiment of the present invention.

FIG. 9 is a schematic structural view of a mobile terminal in accordance with a third embodiment of the present invention. In the third embodiment, the mobile terminal also includes a main body, a control unit and a sensing unit. A display screen 10 is also provided on the front surface of the main body of the mobile terminal. The display screen 10 also includes a hard display screen 11 connected to the main body and a flexible display screen 12 connected to the hard display screen 11. The flexible display screen 12 also includes a first flexible display screen 121 connected to the hard display screen 11 and a second flexible display screen 122 connected to the first flexible display screen 121. A first fold line 123 is formed between the first flexible display screen 121 and the second flexible display screen 122.

Further, as shown in FIG. 9, the first flexible display screen 121 includes a first sub screen 121a connected to the hard display screen 11 and a second sub screen 121b connected to the first sub screen 121a and the second flexible display screen 122. A second fold line 124 is formed between the first sub screen 121a and the second sub screen 121b. The first flexible display screen 121 is foldable along the second fold line 124. The lengths of the first flexible display screen 121 and the second flexible display screen 122 are equal. The sum of the lengths of the second flexible display screen 122 and the second sub screen 121b is equal to the sum of the lengths of the first sub screen 121a and the hard display screen 11.

In the present embodiment, the width of the display screen 10 is preferably 74 mm and the length is preferably 210 mm. The total length of the flexible display screen 12 is preferably 130 mm, the distance between the first fold line 123 and the free end of the second flexible display screen 122 is preferably 65 mm, the distance between the second fold line 124 and the free end of the second flexible display screen 122 is preferably 105 mm. That is, the length of the hard display screen 11 is 80 mm, the length of the first sub screen 121a is 25 mm, the length of the second sub screen 121b is 50 mm, and the length of the second flexible display screen 122 is 65 mm.

When the flexible display screen 12 is folded along the second fold line 124, the second flexible display screen 122 of the flexible display screen 12 and the second sub screen 121b of the first flexible display screen 121 cover the hard display screen 11 and the first sub screen 121a of the first flexible display screen 121. The outer shape of the mobile terminal of the present embodiment is no different with the ordinary mobile terminal when the flexible display screen 12 is folded along the second fold line 124.

In the third embodiment, the control unit is further configured to sense the angular change between the first sub screen 121a and the second sub screen 121b according to the deformation sensing unit provided around the second fold line 124 and control the PDLC layer to change the transparency of the first flexible display screen 121 according to the angular change. For example, when the angle between the first sub screen 121a and the second sub screen 121b is gradually decreased and decreased to the angular preset value of 90°, the control unit controls the PDLC layer to start increasing the transparency of the second sub screen 121b. For example, when the angle between the first sub screen 121a and the second sub screen 121b is 90°, the transparency of the second sub screen 121b is increased to 10%. When the angle between the first sub screen 121a and the second sub screen 121b is gradually increased and greater than the angular preset value of 90°, the control unit controls the PDLC layer to reduce the transparency of the second sub screen 121b. The angular preset values of the second fold line 124 may or may not be equal to the angular preset value of the first fold line 123. In the present embodiment, the angular preset value of the second fold line 124 is equal to the angular preset value of the first fold line 123.

The control unit is further configured to control the display state of the image displayed on the first flexible display screen 121 according to the angular change between the first sub screen 121a and the second sub screen 121b sensed by the deformation sensing unit provided around the second fold line 124. For example, when the angle between the first sub screen 121a and the second sub screen 121b is gradually decreased and decreased to the angular preset value of 90°, the control unit controls the second sub screen 121b to display an image inversely. When the angle between the first sub screen 121a and the second sub screen 121b is gradually increased and greater than the angular preset value of 90°, the control unit controls the image displayed by the second sub screen 121b from an inverted image to a normal display image.

The control unit is further configured to activate the touch sensing layer provided on the back surface of the first flexible display screen 121 based on the transparency of the first flexible display screen 121. For example, when the transparency of the second sub screen 121b is greater than 10%, the control unit may activate the touch sensing layer on the back surface of the second sub screen 121b so that the touch sensing layer can receive the touch input of the user. That is, when the angle between the first sub screen 121a and the second sub screen 121b is gradually decreased and decreased to the angular preset value, the control unit activates the touch sensing layer on the back surface of the second sub screen 121b. When the angle between the first sub screen 121a and the second sub screen 121b is gradually increased and greater than the angular preset value, the control unit keeps the touch sensing layer on the back surface of the second sub screen 121b in a deactivated state. Thus, the touch input of the user is prevented from being received from the back surface of the sub screen when the sub screen is in an expanded state.

In the third embodiment of the mobile terminal, the control unit may be configured to: control the second flexible display screen 122 and the second sub screen 121b in an opaque state when the flexible display screen 12 is folded along the second fold line 124 and in a fully folded state and the mobile terminal is in a standby mode. When the mobile terminal is activated by an external input, the hard display screen 11 and the first sub screen 121a are in an off-screen state, and the control unit first controls the second flexible display screen 122 and the second sub screen 121b to be in a fully transparent state according to the signal of the deformation sensing unit and controls the second flexible display 122 and the second sub screen 121b to display the preset image inversely. In this state, the second flexible display screen 122 and the second sub screen 121b are used as a whole to display an image.

In the third embodiment of the mobile terminal, the control unit may be configured to: control the second flexible display screen 122 and the second sub screen 121b in a fully transparent state when the flexible display screen 12 is folded along the second fold line 124 and in a fully folded state and the mobile terminal is in a standby mode. When the mobile terminal is activated by an external input, the hard display screen 11 and the first sub screen 121a are in an off-screen state, and the control unit first activates the second flexible display screen 122 and the second sub screen 121b and controls the second flexible display screen 122 and the second sub screen 121b to display the preset image inversely. In this state, the second flexible display screen 122 and the second sub screen 121b are used as a whole to display an image.

In the third embodiment of the mobile terminal, when the flexible display screen 12 is in a fully folded state along the first fold line 123, the display logic of the display screen 10 is identical to that of the first embodiment of the mobile terminal and no redundant detail is to be given herein.

In the third embodiment of the mobile terminal, by adding the second fold line 124 to the first flexible display screen 121, the operation state of the mobile terminal can be increased, the operation and usage mode of the mobile terminal can be more diversified, and the storage of the mobile terminal is also more convenient.

In addition, it is to be noted that the length of the first sub screen 121a is 25 mm in the present embodiment. In other embodiments of the present invention, the length of the first sub screen 121a may be 0. When the length of the first sub screen 121a is 0, the flexible display screen 12 may be folded along the second fold line 124 and to cover the hard display screen 11, so that when the angle between the flexible display screen 12 and the hard display screen 11 is less than the angular preset value, the control unit can control the transparency of the entire flexible display screen 12 and control the image displayed on the entire flexible display screen 12 to be displayed inversely.

Fourth Embodiment

Figure 10:
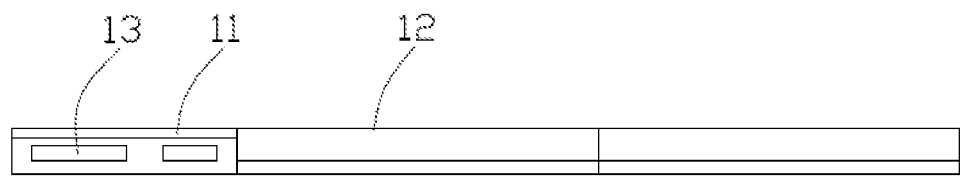
FIG. 10 is a schematic structural view of a mobile terminal according to a fourth embodiment of the present invention.

FIG. 10 is a schematic structural view of a mobile terminal in accordance with a fourth embodiment of the present invention. The mobile terminal in the fourth embodiment may be any one of the mobile terminals in the first to third embodiments. The fourth embodiment is different from the above-mentioned three embodiments in that the fourth embodiment is provided with a splicing power supply and data interface 13 on the main body of the above three mobile terminals.

As shown in FIG. 10, the splicing power supply and data interface 13 is provided on two opposite sides of the main body of the mobile terminal of the fourth embodiment. In the present embodiment, the splicing power supply and data interface 13 is provided on the top side and the bottom side of the main body of the mobile terminal. The bottom side of the main body refers to the lower end of the hard display screen 11 when the main body is placed longitudinally, that is, the side of an ordinary mobile phone where the power supply interface is provided.

That is, in the present embodiment, the splicing power supply and data interface 13 includes a first splicing power supply and data interface provided on the top side of the main body and a second splicing power supply and data interface provided on the bottom side of the main body. The first splicing power and data interface and the second splicing power and data interfaces can cooperate with each other to perform energy and data transmission between mobile terminals. The splicing power and data interface 13 can be integrated into one interface that can be used for energy or data transmission, or can be divided into two interfaces for energy transmission and data transmission, respectively.

By setting the first splicing power supply and data interface and the second splicing power supply and data interface, a plurality of mobile terminals of the present invention can be spliced together to form a modular terminal device, so that the display screens 10 of the plurality of mobile terminals can be integrated into a larger display screen 10, the energy and data sharing between mobile terminals is realized, so as to be suitable for applications requiring large screen display devices.

In order to facilitate the splicing of a plurality of mobile terminals and ensure that the gap between adjacent mobile terminals is minimized after splicing, the first splicing power supply and data interface may be provided with a first conductive contact which can be received in or extended from the splicing power supply and data interface, and the second splice power supply and data interface may be provided with a second conductive contact which is elastically deformable by the pushing of the first conductive contact. The specific interface and arrangement of the first conductive contact and the second conductive contact have been disclosed in China Patent of CN201510050123.0 and CN201510075047.9, and no redundant detail is to be given herein.

The mobile terminal of the present invention preferably adopts a borderless display screen 10 in order to realize the seamless splicing of the screens of the adjacent mobile terminals after splicing thereby improving the display effect of the splice screens. Of course, a narrow bezel display 10 having a frame width of less than 1 mm may also be adopted.

Figure 11:
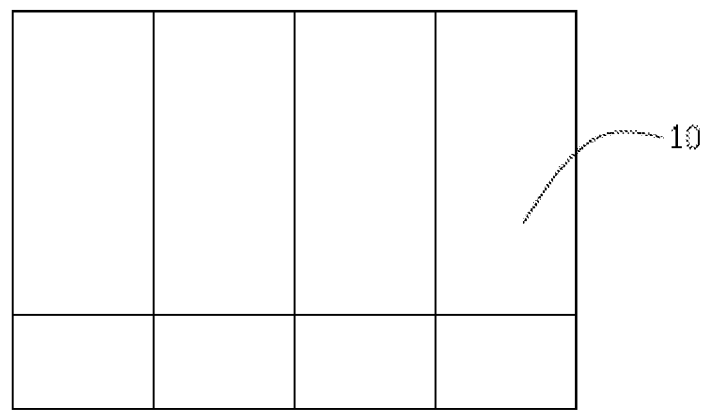
FIG. 11 is a schematic view in which four mobile terminals of the first embodiment are spliced together.
Figure 12:
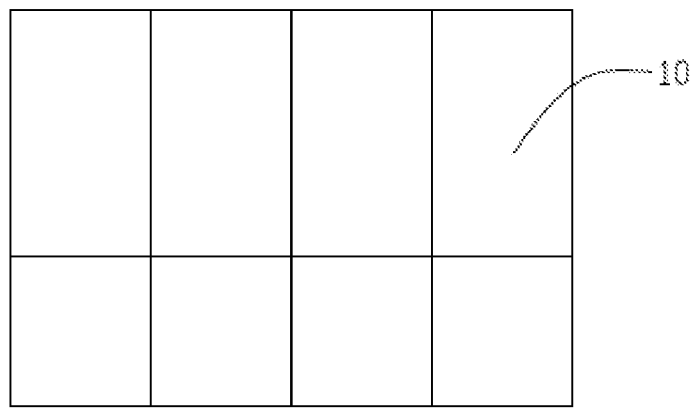
FIG. 12 is a schematic view in which four mobile terminals of the second embodiment spliced together.

As an example in which a plurality of mobile terminals of the present invention are spliced together to form a modular terminal device, FIG. 11 shows a schematic view in which four mobile terminals of the first embodiments are spliced together, and FIG. 12 shows a schematic view in which four mobile terminals of the second embodiments are spliced together. Of course, the number of mobile terminals spliced together is not limited thereto. In FIGS. 11 and 12, when the four mobile phones of the present invention are spliced together, they can be used as a tablet computer. The hard display screen 11 is used as a keyboard, and most of the frequently used shortcuts and application icons are displayed on the hard display screen 11, thereby being operated and used by the user conveniently. The flexible display screen 12 can be used as a display screen that displays the main content that the user wants to watch. In the present invention, since the four mobile terminals are spliced together with a special mobile terminal display screen size, the size of the display screen is the same as or close to that of an A4 paper, and the display effect and the font are close to the actual print.

In summary, in the mobile terminal and the modular terminal device of the present invention, the display screen can be expanded according to the usage requirement when in use and can be folded up when not in use. Further, a plurality of mobile terminals may be spliced together to form a modular terminal device when necessary. Thus, the needs of large-screen size are satisfied and also the mobile terminals are easy to carry.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 13:
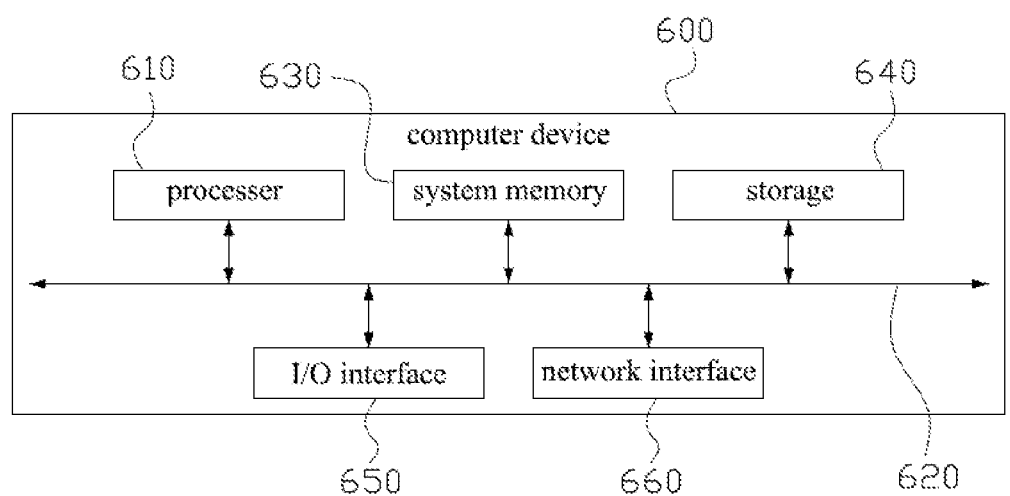
FIG. 13 is a diagram illustrating an example computing system that may be used in one embodiment of the present invention.

In at least some embodiments, a server or computing device that implements a portion or all of one or more of the technologies described herein, including the techniques to implement the functionality of the display screen 10, the mobile terminal and the modular terminal device, may include a general-purpose computer system that includes or is configured to access one or more computer-accessible media. FIG. 13 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

The invention claimed is:

1. A mobile terminal comprising a main body, wherein a front surface of the main body is provided with a display screen, the display screen comprises a hard display screen connected to the main body and a flexible display screen connected to the hard display screen, the hard display screen is located directly above the main body, the flexible display screen protrudes from the main body, the flexible display screen comprises a first flexible display screen connected to the hard display screen and a second flexible display screen connected to the first flexible display screen, a first fold line is formed between the first flexible display screen and the second flexible display screen, and the flexible display screen is foldable along the first fold line;

wherein the mobile terminal further comprises a control unit and a sensing unit, the sensing unit is configured to sense an angle between the first flexible display screen and the second flexible display screen, the control unit is configured to change a transparency of the second flexible display screen in response to an angular change between the first flexible display screen and the second flexible display screen sensed by the sensing unit.

2. The mobile terminal according to claim 1, wherein the flexible display screen comprises a polymer dispersed liquid crystal layer, and the control unit changes a transparency of the flexible display screen by controlling an electrical signal applied to the polymer dispersed liquid crystal layer.

3. The mobile terminal according to claim 1, wherein the control unit is configured to control the second flexible display screen to display an inverted image when the angle between the first flexible display screen and the second flexible display screen is less than an angular preset value.

4. The mobile terminal according to claim 1, wherein a front surface and a back surface of the flexible display screen are provided with a touch sensing layer, and the control unit is configured to activate the touch sensing layer on the back surface of the flexible display screen based on a transparency of the flexible display screen and activate the flexible display screen based on a gesture input applied to the touch sensing layer.

5. The mobile terminal according to claim 1, wherein the control unit is configured to control the hard display screen to display a frequently used operation key and a page of functions that do not require a large screen display and control the flexible display screen to display a page of functions that require a large screen display.

6. The mobile terminal according to claim 1, wherein a length of the first flexible display screen is equal to a length of the second flexible display screen.

7. The mobile terminal according to claim 1, wherein a length of the second flexible display screen is equal to a sum of a length of the first flexible display screen and a length of the hard display screen.

8. The mobile terminal according to claim 1, wherein the first flexible display screen comprises a first sub screen connected to the hard display screen and a second sub screen connected to the first sub screen and the second flexible display screen, a second fold line is formed between the first sub screen and the second sub screen, and the first flexible display screen is foldable along the second fold line.

9. The mobile terminal according to claim 8, wherein a length of the first flexible display screen is equal to a length of the second flexible display screen, and a sum of a length of the second flexible display screen and a length of the second sub screen is equal to a sum of a length of the first sub screen and a length of the hard display screen.

10. The mobile terminal according to claim 9, wherein the control unit is further configured to control a transparency of the second sub screen and the second flexible display screen based on an angular change between the first sub screen and the second sub screen.

11. The mobile terminal according to claim 1, wherein two opposite sides of the mobile terminal are provided with a first splicing power supply and data interface and a second splicing power supply and data interface that can cooperate with each other.

12. A modular terminal device, wherein a plurality of mobile terminals spliced together, the mobile terminal is a mobile terminal according to claim 1.

* * * * *